United States Patent
Kaltsounis et al.

(10) Patent No.: US 12,372,105 B2
(45) Date of Patent: Jul. 29, 2025

(54) DUCT HAVING AIR DIRECTION FEATURE

(71) Applicant: FCA US LLC, Auburn Hills, MI (US)

(72) Inventors: Nicholas O Kaltsounis, Rochester Hills, MI (US); Marius Neagu, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 22 days.

(21) Appl. No.: 18/476,596

(22) Filed: Sep. 28, 2023

(65) Prior Publication Data
US 2025/0109758 A1    Apr. 3, 2025

(51) Int. Cl.
    F02M 35/10    (2006.01)
    F15D 1/04     (2006.01)
    F16L 41/02    (2006.01)

(52) U.S. Cl.
    CPC ......... F15D 1/04 (2013.01); F02M 35/10157 (2013.01); F02M 35/10321 (2013.01); F02M 35/10347 (2013.01); F16L 41/023 (2013.01)

(58) Field of Classification Search
    CPC ....... F02M 35/10157; F02M 35/10262; F02M 35/10; F02M 35/10078; F02M 35/104; F02M 26/17; F02M 26/19; F02M 35/10288; F02M 35/10354; F02M 35/12; F02M 35/1205; F02M 23/003; F16L 9/19; F16L 9/20; F15D 1/02; F15D 1/04
    USPC ...... 123/559.1, 383, 184.21, 184.56, 184.44, 123/184.53, 184.59, 184.61
    See application file for complete search history.

(56) References Cited

U.S. PATENT DOCUMENTS

| | | | |
|---|---|---|---|
| 6,378,309 B1 * | 4/2002 | Divecha | F02B 37/007 123/562 |
| 8,950,183 B2 * | 2/2015 | Nixon | F02M 35/10262 60/611 |
| 2008/0032618 A1 * | 2/2008 | Katoh | B60H 1/00564 454/143 |
| 2009/0126670 A1 * | 5/2009 | Kado | F02M 35/10268 123/184.21 |
| 2010/0242892 A1 * | 9/2010 | Takakuwa | F02M 35/10039 123/184.53 |
| 2010/0290930 A1 * | 11/2010 | Arvidsson | F04B 17/05 417/364 |

(Continued)

FOREIGN PATENT DOCUMENTS

| CN | 10115317 A | * | 4/2008 |
|---|---|---|---|
| CZ | 435687 A3 | * | 11/1993 |

(Continued)

Primary Examiner — George C Jin
Assistant Examiner — Teuta B Holbrook
(74) Attorney, Agent, or Firm — Jeremy J. Klobucar

(57) ABSTRACT

An air intake duct configured to provide intake air to a first component and a second component. The duct includes a first conduit that provides the intake air to the first component and a second conduit that provides the intake air to the second component, wherein an air direction feature in the form of an elongated ridge is formed in the air intake duct at an intersection between the first conduit and the second conduit, and the air direction feature is located and oriented in the air intake duct to control an amount of the intake air that is permitted to enter each of the first conduit and the second conduit, and to control a swirl direction of the intake air as the intake air travels over elongated ridge and enters each of the first conduit and the second conduit.

14 Claims, 8 Drawing Sheets

(56) References Cited

U.S. PATENT DOCUMENTS

| | | | | |
|---|---|---|---|---|
| 2018/0187592 A1* | 7/2018 | Bardakjy | ............... | F02C 6/12 |
| 2018/0201087 A1* | 7/2018 | Soto | ............... | B60H 1/00564 |
| 2022/0112870 A1* | 4/2022 | Takahashi | ............... | F02M 35/10 |

FOREIGN PATENT DOCUMENTS

| | | | | | |
|---|---|---|---|---|---|
| DE | 19627412 | C1 * | 1/1998 | ............ | F01M 13/04 |
| DE | 102018205139 | A1 * | 6/2019 | ............ | F02B 31/04 |
| FR | 2987873 | A1 * | 9/2013 | ....... | F02M 35/10144 |
| WO | WO-02074621 | A1 * | 9/2002 | ............ | B64D 33/02 |
| WO | WO-2022199834 | A1 * | 9/2022 | ....... | F02M 35/10091 |
| WO | WO-2022210120 | A1 * | 10/2022 | ............ | F02B 31/04 |

\* cited by examiner

DUCT HAVING AIR DIRECTION FEATURE

FIELD

The present disclosure relates to a duct that includes an air direction feature.

BACKGROUND

This section provides background information related to the present disclosure which is not necessarily prior art.

In an internal combustion engine, a turbocharger is a forced induction device that is powered by the flow of exhaust gases. The turbocharger uses this energy to compress intake air, and then forces the compressed intake air into the engine in order to produce more power for a give displacement. To compress the intake air, the turbocharger includes a rotating compressor wheel. To avoid air flow pressure loss and noise, vibration, and harshness (NVH) issues, it is important that the airflow direction of the intake air as it enters the compressor wheel is swirling in the same rotation direction as the rotating compressor wheel.

Currently, fan blades or other diverter devices are used to redirect the airflow direction of the intake air such that the intake air is swirling in the same direction as the rotating compressor wheel. These devices, however, add additional cost to turbocharger system, and also create their own NVH issues and can restrict airflow.

Moreover, if the engine includes more than one turbocharger (e.g., two), a Y-shaped air intake duct may be used having an inlet that provides the intake air to a pair of conduits connected to the inlet that provide the intake air to each of the turbochargers. In such a case, the Y-shaped duct is typically designed to provide an equal amount (e.g., volume) of intake air to each of the turbochargers, which in some cases may be undesirable or unnecessary.

SUMMARY

This section provides a general summary of the disclosure and is not a comprehensive disclosure of its full scope or all of its features.

According to a first aspect of the present disclosure, there is provided a vehicle that comprises a first component; a second component; an air intake duct configured to receive intake air and provide the intake air to each of the first and second components, the duct including an inlet in communication with a first conduit that provides the intake air to the first component and in communication with a second conduit that provides the intake air to the second component, wherein an air direction feature in the form of an elongated ridge is formed in the air intake duct at an intersection between the first conduit and the second conduit, and wherein the air direction feature is located and oriented in the air intake duct to control an amount of the intake air that is permitted to enter each of the first conduit and the second conduit, and to control a swirl direction of the intake air as the intake air travels over elongated ridge and enters each of the first conduit and the second conduit.

According to the first aspect, the air direction feature is located and oriented in the air intake duct to restrict an amount of air that enters one of the first conduit and the second conduit, and permit a greater amount of air to enter the other of the first conduit and the second conduit.

According to the first aspect, the elongated ridge includes a first end located proximate the inlet and an opposite second end located proximate the inlet, a width of the elongated ridge increases as it extends from the first end toward the intersection between the first conduit and the second conduit, and the width of the elongated ridge decreases as it extends from the intersection between the first conduit and the second conduit to the second end.

According to the first aspect, the first component is a first turbocharger and the second component is a second turbocharger.

According to a second aspect of the present disclosure, there is provided a method for manufacturing an air intake duct having an inlet configured for receipt of intake air and in communication with a first conduit that provides the intake air to a first component and in communication with a second conduit that provides the intake air to a second component. The method includes determining a position of the first component and the second component relative to one another; determining a rotation direction of a rotating device of each of the first component and the second component; determining a length each of the first conduit and the second conduit based on the positions of the first component and the second component; determining a location and an orientation of an air direction feature that is located in the air intake duct at a position between the first conduit and the second conduit; and molding the air intake duct including the inlet, first conduit, the second conduit, and the air direction feature located between the first conduit and the second conduit, wherein the step of determining the location and orientation of the air direction feature includes adjusting the location of the air direction feature based on a volume of intake air to be received by each of the first component and the second component, and adjusting an orientation of the air direction feature such that the intake air that enters each of the first and second conduits swirls in a direction that matches the rotation directions of each of the rotating devices.

According to the second aspect, adjusting the location of the air direction features includes moving the air direction feature nearer to one of the first and second conduit to restrict an amount of air that enters one of the first conduit and the second conduit and permit a greater amount of air to enter the other of the first conduit and the second conduit.

According to the second aspect the air direction feature is defined by an elongated ridge having a first end located proximate the inlet and an opposite second end located proximate the inlet, and the adjusting the orientation of the air direction feature includes adjusting a location of one of the first end and the opposite second end to tilt the elongated ridge and control how the intake air swirls when entering each of the first and second conduits.

According to the second aspect a width of the elongated ridge increases as it extends from the first end toward an intersection between the first conduit and the second conduit, and the width of the elongated ridge decreases as it extends from the intersection between the first conduit and the second conduit to the opposite second end.

According to the second aspect the molding the air intake duct includes using an injection molding process.

According to the second aspect the molding the air intake duct includes molding a first piece and a second piece, and then mating the first piece to the second piece to assemble the air intake duct.

According to the second aspect the air intake duct is formed from a rigid polymeric material.

According to the second aspect, the first component is a first turbocharger and the second component is a second turbocharger.

According to the second aspect, the rotating devices are compressor wheels.

Lastly, the present disclosure provides an intake air duct manufactured according to the method of the second aspect.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
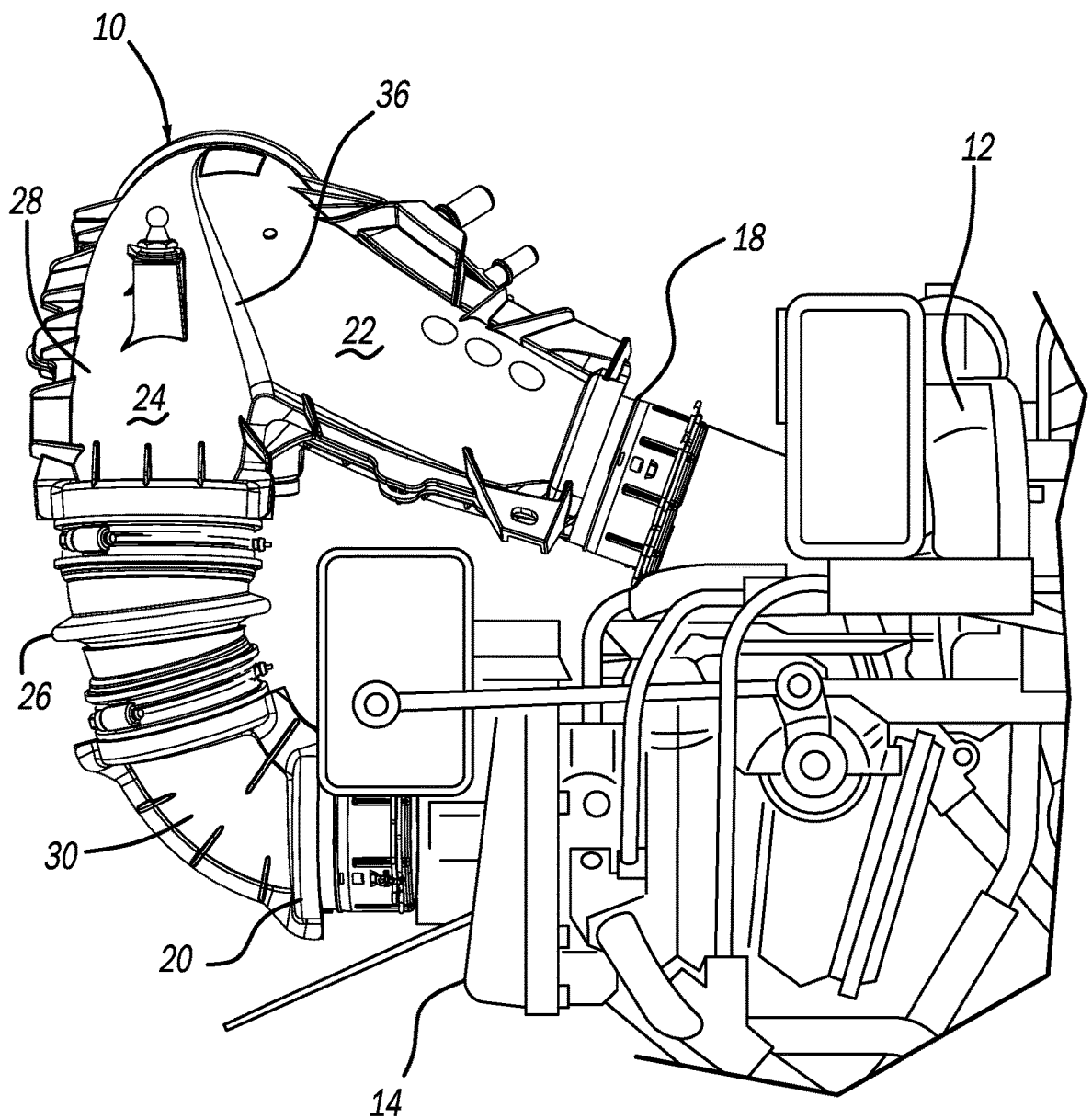
FIG. 1 is a perspective view of an air intake duct according to a principle of the present disclosure that provides intake air to a pair of turbochargers.

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

FIGS. 1 and 3 to 7 illustrate an example air intake duct 10 that is configured to direct intake air to a pair of components including a first component 12 and a second component 14. In the illustrated embodiment, the first and second components 12 and 14 are turbochargers. It should be understood, however, that the first and second components 12 and 14 do not necessarily need to be turbochargers and can be any component that is configured for receipt of intake air.

Air intake duct 10 includes an inlet 16 (see, e.g., FIGS. 4-7) and a first outlet 18 and a second outlet 20. A first conduit 22 connects inlet 16 and first outlet 20, while a second conduit 24 connects inlet 16 and second outlet 24. First conduit 22 provides intake air to first turbocharger 12 and second conduit 24 provides intake air to second turbocharger 14. More specifically, air intake duct 10 may be a Y-shaped duct to provide intake air to each of the first and second turbochargers 12 and 14 simultaneously.

Figure 2:
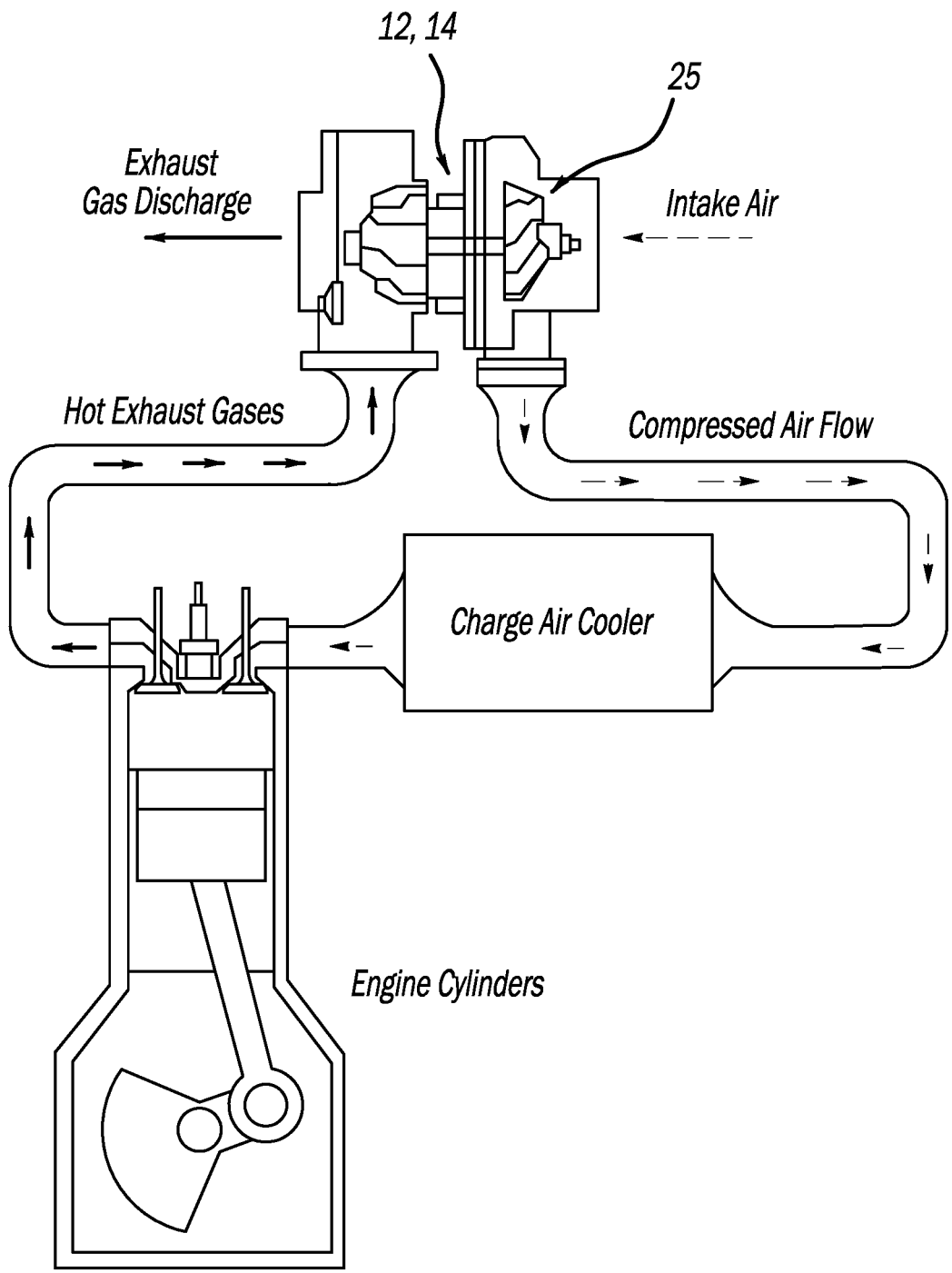
FIG. 2 is a schematic representation of an example turbocharger.
Figure 3:
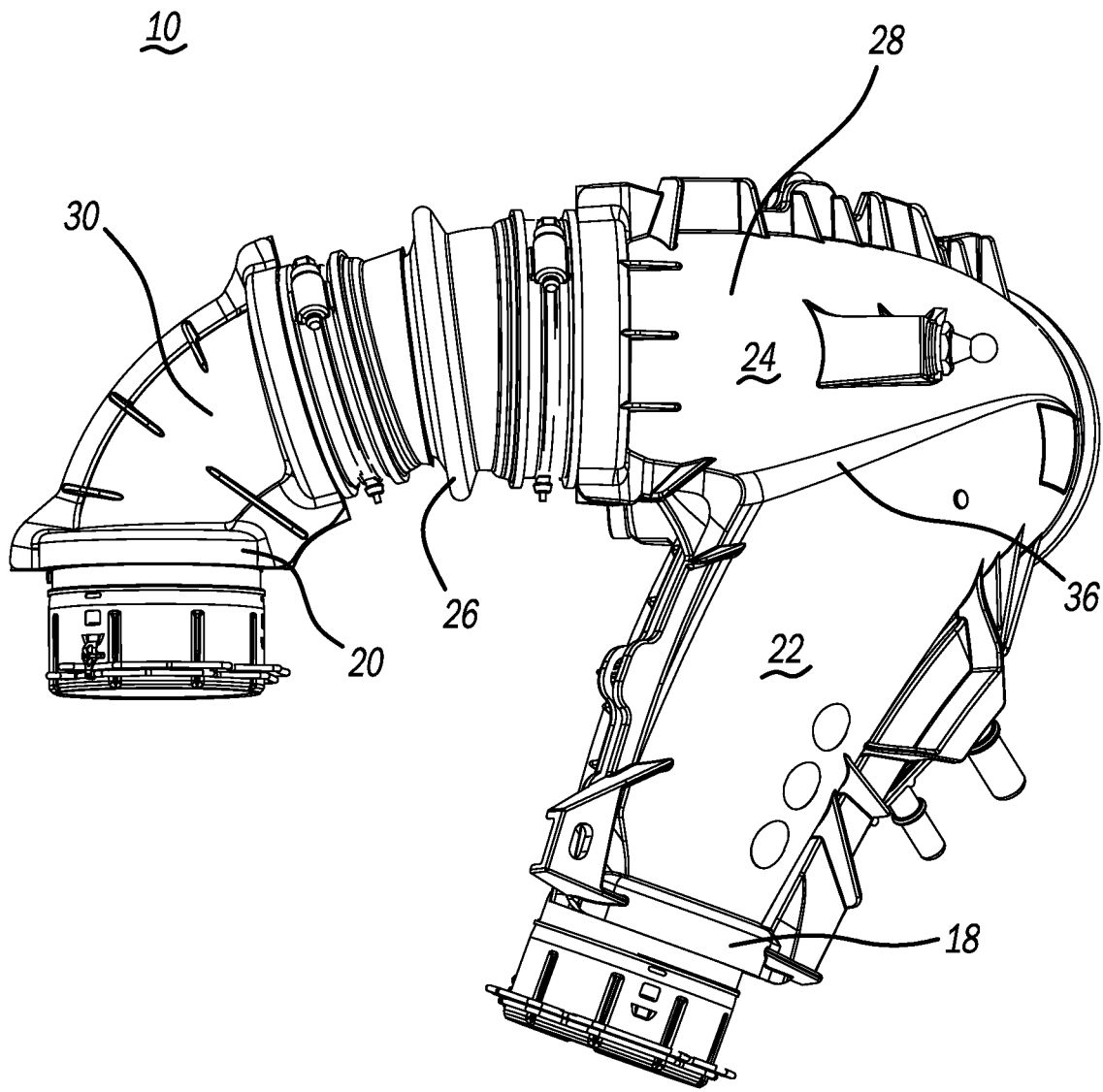
FIG. 3 is a top perspective view the air intake duct illustrated in FIG. 1.
Figure 4:
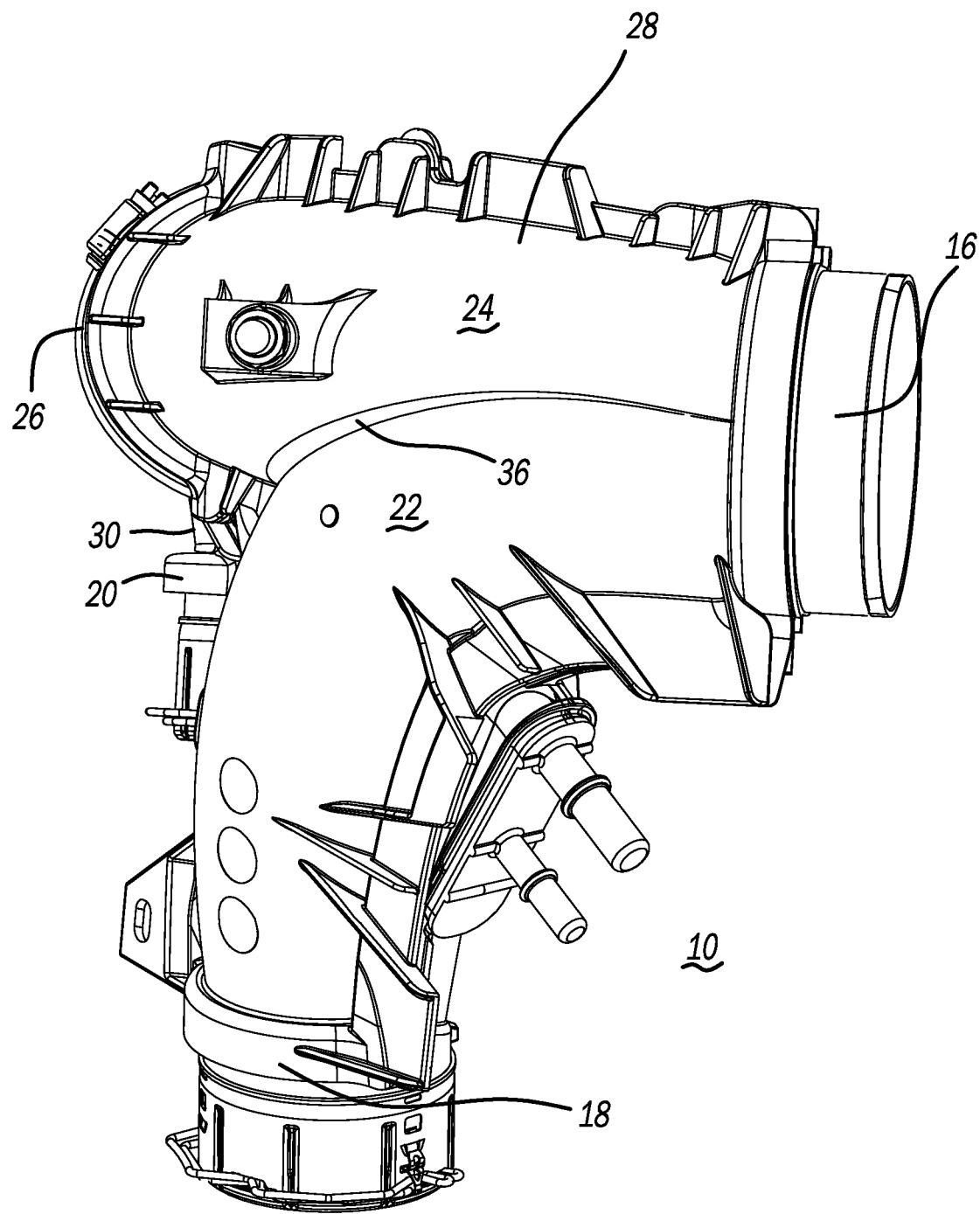
FIG. 4 is a side perspective view of the air intake duct illustrated in FIG. 3.

Air intake duct 10 can be formed of any material desired by one skilled in the art. Example materials for forming air intake duct 10 include metal materials such as steel, aluminum, titanium, or other metal material such as alloys. Alternatively, air intake duct 10 can be formed of a rigid polymeric material such as polyamide (e.g., NYLON®), polystyrene, or any other rigid polymeric material known to one skilled in the art. The polymer may be reinforced with carbon fibers, glass fibers, glass beads, or any other reinforcement material known to one skilled in the art. Preferably, air intake duct 10 is a molded product formed from a rigid polymeric material, which enables air intake duct 10 to be designed and formed to have a specific orientation and connection between the first and second conduits 22 and 24 such that air that enters each of the first and second conduits 22 and 24 can swirl in the correct direction that matches a direction of rotation of a compressor wheel 25 (FIG. 2) of each of the first and second turbochargers 12 and 14, as will be described in more detail later.

As shown in FIG. 1, the first and second turbochargers 12 and 14 are located at different locations relative to one another. First and second conduits 22 and 24, therefore, can have different lengths to account for the different locations of the first and second turbochargers 12 and 14. In addition, it should be understood that one or each of the conduits (e.g., second conduit 24) may include a coupling 26 that connects a first section 28 and second section 30 of a respective conduit (e.g., second conduit 24). Again, while only conduit 24 is illustrated as including coupling 26 and first and second sections 28 and 30, it should be understood that first conduit 22 may also have such a configuration. In the event that one of the conduits 22, 24 includes a coupling 26, it should be understood that coupling 26 may be formed of a material similar to that used to form air intake duct 10, or may be formed of a different material. For example, coupling 26 may be formed of a flexible polymeric material rather than a rigid polymeric material, without limitation.

As noted above, first and second conduits 22 and 24 may be oriented and connected to one another such that as the air received by inlet 16 is directed into each of the first and second conduits 22 and 24, the air swirls in a direction that matches a rotation direction of the rotating devices (e.g., compressor wheels) 25 located in each of the first and second turbochargers 12 and 14, respectively. Specifically, first conduit 22 is connected to second conduit 24 by an air flow direction feature 32, a position and orientation of which can be pre-selected based on a number of different factors including the rotation direction of the compressor wheels 25 of each of the first and second turbochargers 12 and 14, a length of each of the conduits 22 and 24, a diameter of each of the first and second conduits 22 and 24, an amount of air that needs to be directed into each of the first and second conduits, and whether or not a respective conduit 22 and/or 24 includes a coupling 26. Air flow direction feature 32 is best shown in FIGS. 5 to 7.

Figure 5:
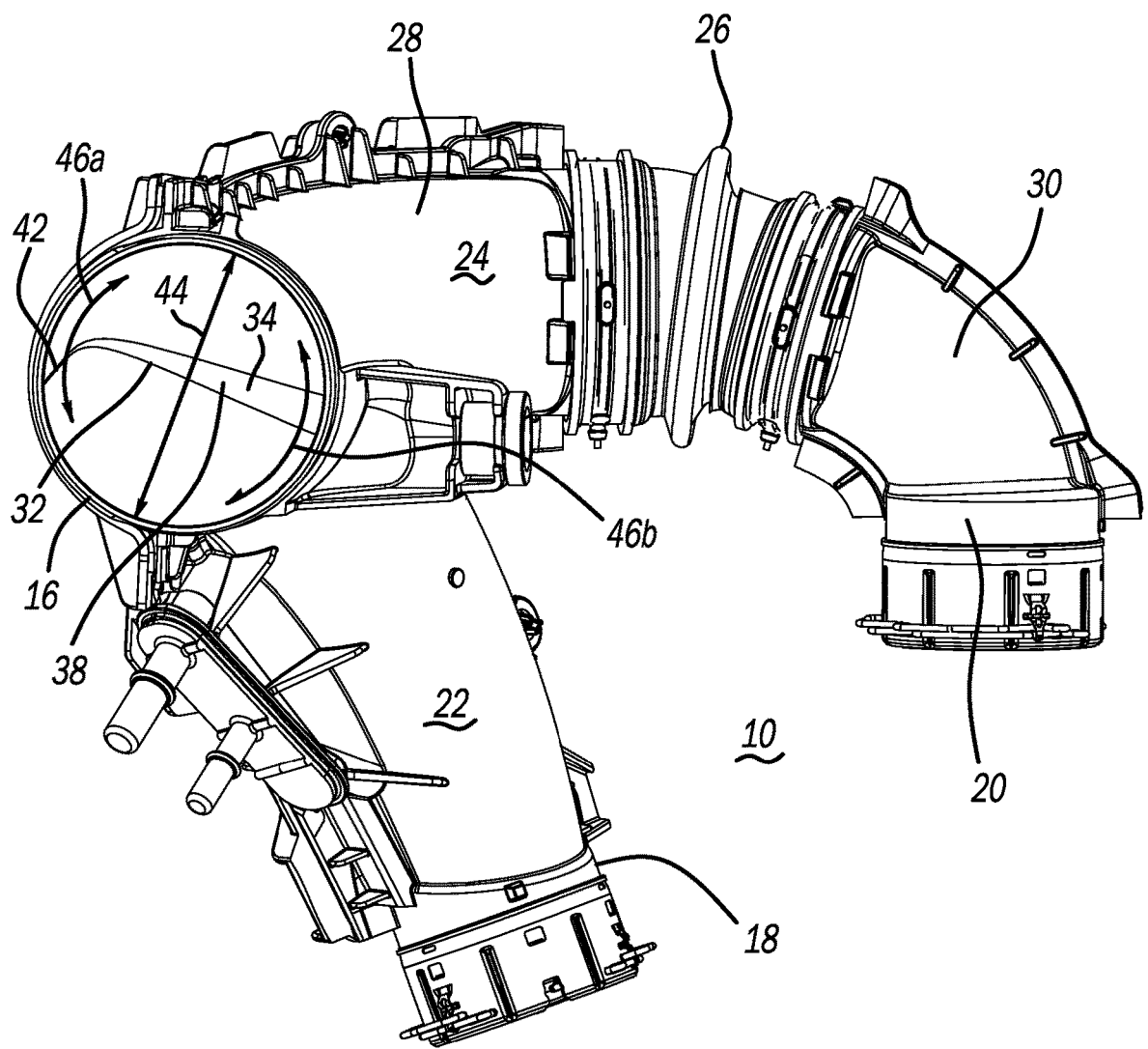
FIG. 5 is a bottom perspective view of the air intake duct illustrated in FIG. 3.
Figure 6:
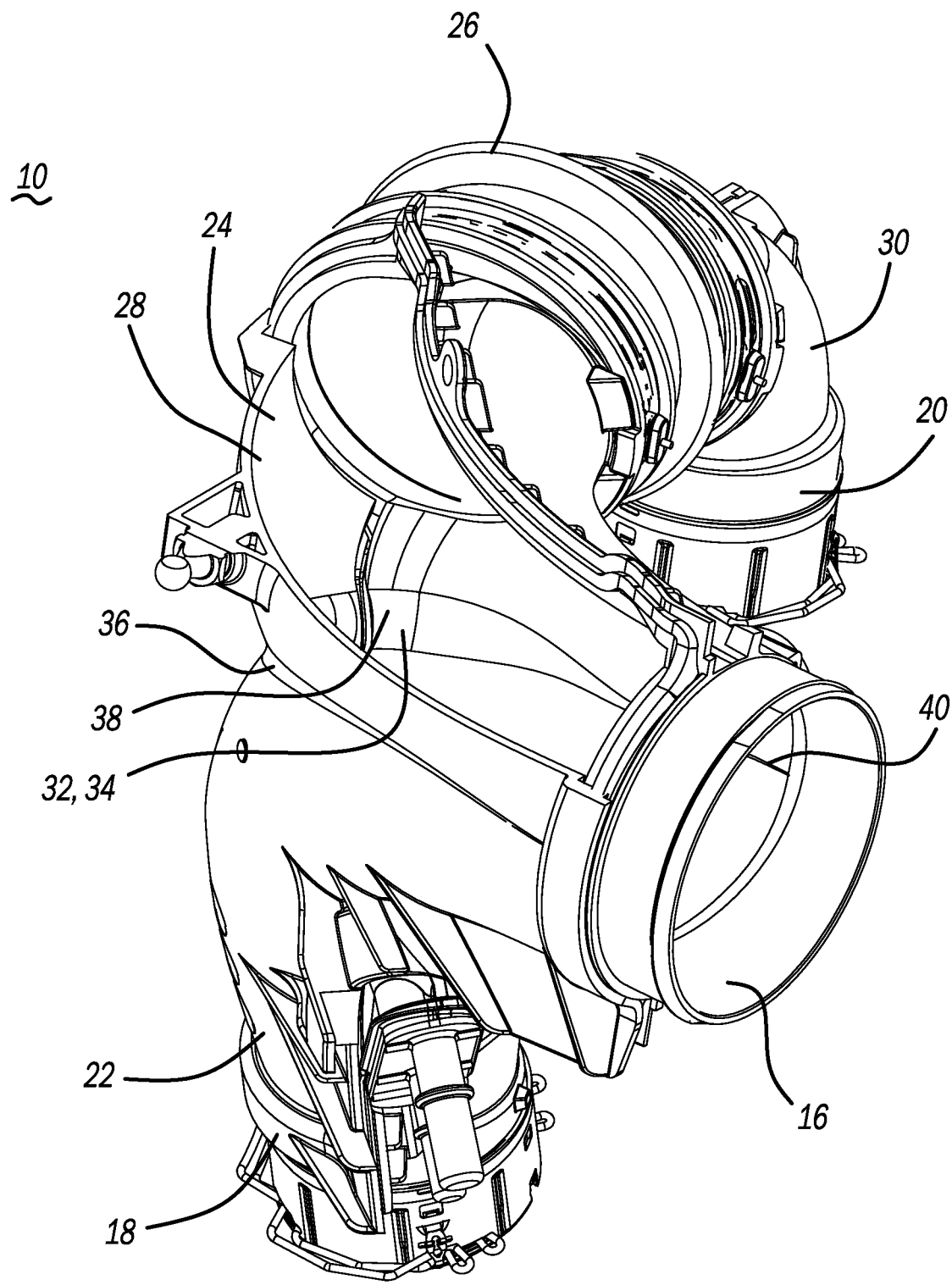
FIG. 6 is a first perspective cross-sectional view of the air-intake duct illustrating a first end of an air direction feature of the air-intake duct.
Figure 7:
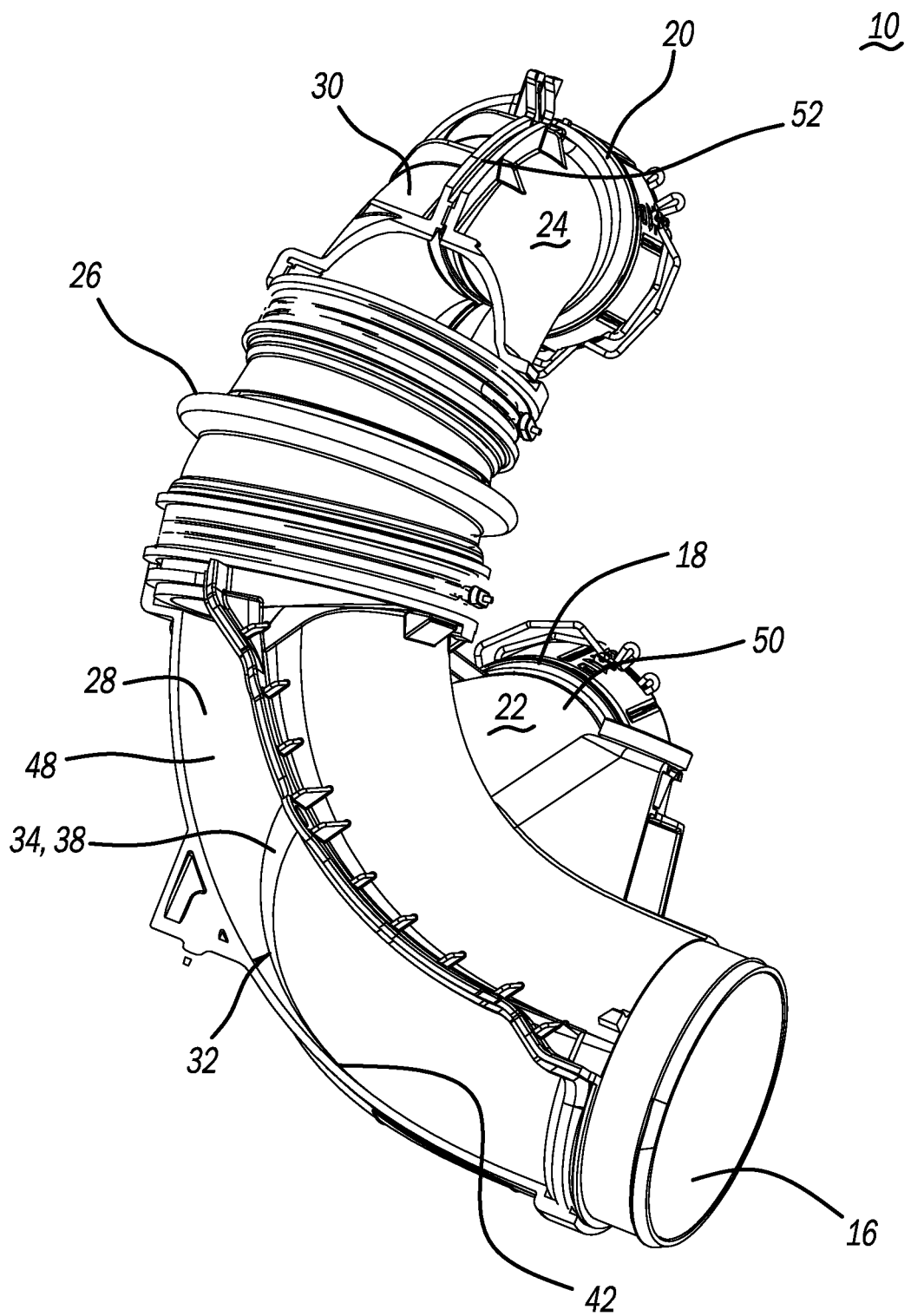
FIG. 7 is a second perspective cross-sectional view of the air-intake duct illustrating an opposite second end of the air direction feature of the air-intake duct.

Referring to FIGS. 5 to 7, air flow direction feature 32 may be an elongated ridge or protuberance 34 formed at an intersection 36 between first conduit 22 and second conduit 24. Ridge 34 is formed during the molding process of forming duct 10. Ridge 34 includes a peak 38 that may be flat, rounded, or sharply formed. As best shown in FIGS. 5 to 7, ridge 34 includes a first end 40 (FIG. 6) and an opposing second end 42 (FIG. 5-7). Each of first and second ends 40 and 42 are located proximate inlet 16. As air flow direction feature 32 extends from first end 40 toward second end 42, a width of ridge 34 may increase, with the greatest width of the ridge 34 being located at the intersection 36 between first conduit 22 and second conduit 24. As shown in FIGS. 5-7, first and second ends 40 and 42 may be diametrically opposed to each other proximate inlet 16. As will be described in more detail, below, however, first and second ends 40 and 42 are not necessarily always diametrically opposed to each other because, as noted above, the location and orientation of the ridge 34 of air flow direction feature 32 can specifically tailored based on the above-noted factors.

More specifically, again referring to FIG. 5, when designing air intake duct 10 before being placed in a vehicle (not shown) including the first and second turbochargers 12 and 14, it should be understood that the location of ridge 34 can be moved along the double-arrow line 44 (i.e., from side to side) to adjust the intersection 36 between first conduit 22 and second conduit 24, which may be used to adjust the amount of air that enters each of the first and second conduits 22 and 24. That is, moving the location of the ridge closer towards a respective conduit (e.g., first conduit 22) can restrict an amount of air that is permitted to enter the respective conduit while increasing an amount of air that is permitted to enter the other conduit (e.g., second conduit 24).

In addition, using the first end 40 as a starting point (e.g., a location of the first end 40 can fixed), the location of second end 42 of air flow direction feature 32 can be moved along the curved double-arrow line 46a to further adjust the angle of the intersection 36 (i.e., tilt) between the first and second conduits 22 and 24. Put another way, moving the location of the second end 42 can tilt or curve the ridge 34. In such a case, second end 42 may not necessarily be diametrically opposed to first end 40. It should also be understood that the location of second end 42 can be used as a starting point (e.g., fixed), and the location of first end 40 can be moved along the curved double-arrow line 46b, if desired. By tilting or curving the air flow direction feature 32 either towards or away from a respective conduit 22 or 24 during the initial design process, the flow of air through each of the first conduit 22 and the second conduit 24 can be influenced to swirl in the same direction as the direction of rotation of the compressor wheels 25 that are located in each of the first and second turbochargers 12 and 14, respectively. That is, by adjusting the tilt or curvature of the ridge 34, intake air passing over air flow direction feature can swirl the intake air (either clockwise or counterclockwise) as it enters a respective conduit such that the swirly matches the rotating direction of the compressor wheel 25 of the turbocharger 12 or 14 to which a respective conduit 22 or 24 is in fluid communication.

It should be understood that by adjusting the location of air flow direction feature along line 44 and lines 46a or 46b during the design process, air intake duct 10 is able to be designed to swirl the intake air in each of the first and second conduits 22 and 24 without the need to incorporate additional air direction features into air intake duct 10. That is, there is no need to provide additional components in duct 10 such as fan blades, diverter blades, or other air flow direction devices that influence the swirling of the intake air to achieve the desired swirl direction in each conduit 22 and 24. Rather, by pre-selecting the location and orientation of the air flow direction feature 32 during the design process, and then forming air flow direction feature 32 during the molding process of forming duct 10, the correct swirl direction can be achieved without using these additional devices. Thus, the cost to produce duct 10 and the mass associated with duct 10 can be substantially reduced, and the overall design of duct 10 can be simplified in a simple and efficient manner.

It should be understood that duct 10 can be a monolithic unit including each of inlet 16, first conduit 22, and second conduit 24 that is produced using a molding process such as, for example, injection molding. Alternatively, as illustrated, duct 10 can be a multi-piece structure having a first piece 48 that mates with a second piece 50 (FIG. 7). First and second pieces 48 and 50 can be welded together, or can be formed to include various mating features 52 that secure first piece 48 to second piece 50. If duct 10 includes a coupling 26, it should be understood that second section 30 can also be a multi-piece structure.

Figure 8:
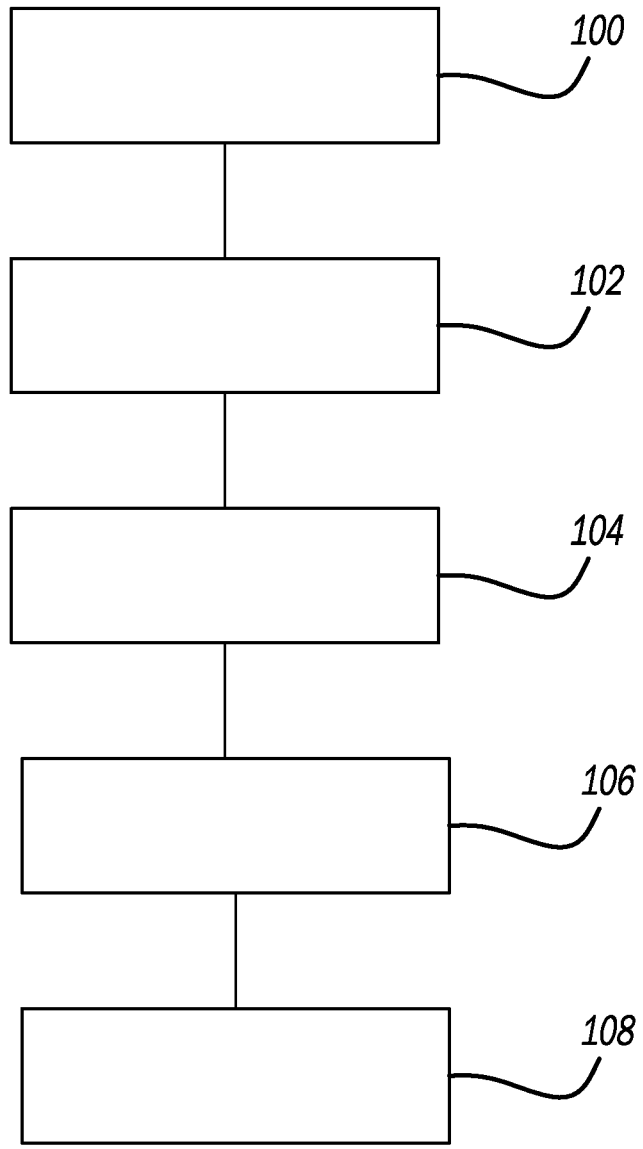
FIG. 8 is a flow chart illustrating a method of designing and manufacturing the air-intake duct illustrated in FIG. 1.

Now referring to FIG. 8, a method of manufacturing duct 10 will be described. Firstly in step 100, the positions of the first and second turbochargers 12 and 14 is determined, as well as the rotation direction of each of the compressor wheels 25 so that a length of the first conduit 22 and the second conduit 24 can be determined (step 102). Then, in step 104 a volume of intake air required by each of the turbochargers 12 and 14 is determined.

After determining the rotation direction of each of the compressor wheels 25, a length of the first and second conduits 22, 24, and a volume of intake air required by each of the turbochargers 12 and 14 is determined, a location and orientation of the air direction feature 32 in the duct 10 is determined (step 106). As noted above, the location of air direction features 32 (i.e., ridge 34) can be moved along the double-arrow line 44 (i.e., from side to side) to adjust the intersection 36 between first conduit 22 and second conduit 24, which may be used to adjust the amount of air that enters each of the first and second conduits 22 and 24. That is, moving the location of the ridge closer towards a respective conduit (e.g., first conduit 22) can restrict an amount of air that is permitted to enter the respective conduit while increasing an amount of air that is permitted to enter the other conduit (e.g., second conduit 24).

With respect to the orientation of the air direction feature 32, the first end 40 of ridge 34 may be used as a starting point (e.g., a location of the first end 40 can be fixed) and the location of second end 42 of air flow direction feature 32 can be moved along the curved double-arrow line 46a to further adjust the angle of the intersection 36 (i.e., tilt) between the first and second conduits 22 and 24. Put another way, moving the location of the second end 42 can tilt or curve the ridge 34 to control how the intake air swirls as it passes over the ridge 34 and enters each of the first and second conduits 24. The location and orientation of the air direction feature 32 in duct 10 can be modeled using modeling software, and virtual simulations may be run to ensure that a volume and swirl of the intake air is correct in each conduit 22, 24 based on the requirements of the vehicle in which turbochargers 12 and 14 are located.

After the correct design for duct 10 including air direction feature 32 is determined, duct 10 can be molded using, for example, an injection molding machine (step 108) and incorporated into a vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
a first component having a first rotating device configured for receipt of intake air;
a second component having a second rotating device configured for receipt of the intake air;
an air intake duct configured to receive the intake air and provide the intake air to each of the first and second components, the duct including an inlet in communication with a first conduit that provides the intake air to the first component and in communication with a second conduit that provides the intake air to the second component,
wherein an air direction feature in the form of an elongated ridge is formed in the air intake duct at an intersection between the first conduit and the second conduit, and
wherein the air direction feature is located and oriented in the air intake duct to control an amount of the intake air that is permitted to enter each of the first conduit and the second conduit, and to control a swirl direction of the intake air as the intake air travels over elongated ridge and enters each of the first conduit and the second conduit such that the intake air that enters each of the first and second conduits swirls in a direction that matches a rotation direction of the first and second rotating devices, respectively.

2. The vehicle according to claim 1, wherein the air direction feature is located and oriented in the air intake duct to restrict an amount of air that enters one of the first conduit and the second conduit, and permit a greater amount of air to enter the other of the first conduit and the second conduit.

3. The vehicle according to claim 1, wherein the elongated ridge includes a first end located proximate the inlet and an opposite second end located proximate the inlet,
a width of the elongated ridge increases as it extends from the first end toward the intersection between the first conduit and the second conduit, and
the width of the elongated ridge decreases as it extends from the intersection between the first conduit and the second conduit to the second end.

4. The vehicle according to claim 1, wherein the first component is a first turbocharger and the second component is a second turbocharger.

5. A method for manufacturing an air intake duct having an inlet configured for receipt of intake air and in communication with a first conduit that provides the intake air to a first component and in communication with a second conduit that provides the intake air to a second component, the method comprising:
determining a position of the first component and the second component relative to one another;
determining a rotation direction of a rotating device of each of the first component and the second component;
determining a length each of the first conduit and the second conduit based on the positions of the first component and the second component;
determining a location and an orientation of an air direction feature that is located in the air intake duct at a position between the first conduit and the second conduit; and
molding the air intake duct including the inlet, first conduit, the second conduit, and the air direction feature located between the first conduit and the second conduit,
wherein the step of determining the location and orientation of the air direction feature includes adjusting the location of the air direction feature based on a volume of intake air to be received by each of the first component and the second component, and adjusting an orientation of the air direction feature such that the intake air that enters each of the first and second conduits swirls in a direction that matches the rotation directions of each of the rotating devices.

6. The method according to claim 5, wherein the adjusting the location of the air direction features includes moving the air direction feature nearer to one of the first and second conduit to restrict an amount of air that enters one of the first conduit and the second conduit and permit a greater amount of air to enter the other of the first conduit and the second conduit.

7. The method according to claim 5, wherein the air direction feature is defined by an elongated ridge having a first end located proximate the inlet and an opposite second end located proximate the inlet, and the adjusting the orientation of the air direction feature includes adjusting a location of one of the first end and the opposite second end to tilt the elongated ridge and control how the intake air swirls when entering each of the first and second conduits.

8. The method according to claim 7, wherein a width of the elongated ridge increases as it extends from the first end toward an intersection between the first conduit and the second conduit, and the width of the elongated ridge decreases as it extends from the intersection between the first conduit and the second conduit to the opposite second end.

9. The method according to claim 5, wherein the molding of the air intake duct includes using an injection molding process.

10. The method according to claim 5, wherein the molding of the air intake duct includes molding a first piece and a second piece, and then mating the first piece to the second piece to assemble the air intake duct.

11. The method according to claim 5, wherein the air intake duct is formed from a rigid polymeric material.

12. The method according to claim 5, wherein the first component is a first turbocharger and the second component is a second turbocharger.

13. The method according to claim 12, wherein the rotating devices are compressor wheels.

14. An air intake duct manufactured according to the method of claim 5.

* * * * *